(12) United States Patent
Hu et al.

(10) Patent No.: US 12,405,400 B2
(45) Date of Patent: Sep. 2, 2025

(54) METHODS AND SYSTEMS FOR METASURFACE-BASED NANOFABRICATION

(71) Applicant: Massachusetts Institute of Technology, Cambridge, MA (US)

(72) Inventors: Juejun Hu, Newton, MA (US); Tian Gu, Fairfax, VA (US); Fan Yang, Cambridge, MA (US); Luigi Ranno, Cambridge, MA (US); Hung-I Lin, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 841 days.

(21) Appl. No.: 17/691,851

(22) Filed: Mar. 10, 2022

(65) Prior Publication Data
US 2022/0357484 A1 Nov. 10, 2022

Related U.S. Application Data

(60) Provisional application No. 63/186,607, filed on May 10, 2021.

(51) Int. Cl.
*G02B 1/00* (2006.01)
*G02B 27/00* (2006.01)

(52) U.S. Cl.
CPC ......... *G02B 1/002* (2013.01); *G02B 27/0012* (2013.01); *G02B 2207/101* (2013.01)

(58) Field of Classification Search
None
See application file for complete search history.

(56) References Cited

U.S. PATENT DOCUMENTS

| | | | |
|---|---|---|---|
| 10,725,290 | B2 | 7/2020 | Fan et al. |
| 10,795,168 | B2 | 10/2020 | Riley, Jr. et al. |
| 10,979,635 | B2 | 4/2021 | Hu et al. |
| 11,067,816 | B1 | 7/2021 | Ghosh |
| 2018/0143470 | A1 | 5/2018 | Oh et al. |
| 2019/0064532 | A1 | 2/2019 | Riley, Jr. et al. |
| 2019/0163067 | A1 | 5/2019 | Koos et al. |
| 2020/0271941 | A1 | 8/2020 | Riley, Jr. et al. |
| 2021/0028215 | A1 | 1/2021 | Devlin et al. |
| 2021/0044748 | A1 | 2/2021 | Hu et al. |
| 2021/0263329 | A1 | 8/2021 | Latawiec |
| 2021/0306564 | A1 | 9/2021 | Hu et al. |
| 2022/0052093 | A1 | 2/2022 | Devlin et al. |
| 2022/0171293 | A1 | 6/2022 | Krishnaswamy et al. |

(Continued)

OTHER PUBLICATIONS

An et al., "A deep learning approach for objective-driven all-dielectric metasurface design." ACS Photonics 6.12 (2019): 3196-3207.

(Continued)

*Primary Examiner* — Robert E. Tallman
(74) *Attorney, Agent, or Firm* — Smith Baluch LLP

(57) ABSTRACT

The present technology is related to optics, optical systems, and optically induced micro-/nano-fabrication methods. It includes metasurface optics, direct laser writing, and microscopy. Flat optic devices, architectures, and methods can achieve superb optical performance and structural simplicity compared to traditional bulk optical systems.

17 Claims, 7 Drawing Sheets

(56) References Cited

U.S. PATENT DOCUMENTS

2022/0252761 A1* 8/2022 Xia .................. G03F 7/70416

OTHER PUBLICATIONS

An et al., "Deep Convolutional Neural Networks to Predict Mutual Coupling Effects in Metasurfaces." arXiv preprint arXiv:2102.01761 (2021), 16 pages.
An et al., "Deep learning modeling approach for metasurfaces with high degrees of freedom." Optics Express 28.21 (2020): 31932-31942.
An et al., "Multifunctional Metasurface Design with a Generative Adversarial Network (Advanced Optical Materials May 2021)." Advanced Optical Materials 9.5 (2021): 2170019, 10 pages.
Cao et al., "High-photosensitive resin for super-resolution direct-laser-writing based on photoinhibited polymerization." Optics Express 19.20 (2011): 19486-19494.
Fischer et al., "The materials challenge in diffraction-unlimited direct-laser-writing optical lithography." Advanced Materials 22.32 (2010): 3578-3582.
Gan et al., "Three-dimensional deep sub-diffraction optical beam lithography with 9 nm feature size." Nature Communications 4.1 (2013): 1-7.
International Search Report and Written Opinion in International Application No. PCT/US2022/028274 mailed Aug. 29, 2022, 10 pages.
Li et al., "Achieving $\lambda/20$ resolution by one-color initiation and deactivation of polymerization." Science 324.5929 (2009): 910-913.
Scott et al., "Two-color single-photon photoinitiation and photoinhibition for subdiffraction photolithography." Science 324.5929 (2009): 913-917.
Shalaginov et al., Design for quality: reconfigurable flat optics based on active metasurfaces. Nanophotonics 9, 3505-3534 (2020).
Wang et al., "Chromatic-aberration-corrected diffractive lenses for ultra-broadband focusing." Scientific Reports 6.1 (2016): 1-7.
Wollhofen et al., "120 nm resolution and 55 nm structure size in STED-lithography." Optics Express 21.9 (2013): 10831-10840.
Wollhofen et al., "Functional photoresists for sub-diffraction stimulated emission depletion lithography." Optical Materials Express 7.7 (2017): 2538-2559.
Yang et al., "Design of broadband and wide-field-of-view metalenses," Opt. Lett. 46, 5735-5738 (2021).

* cited by examiner

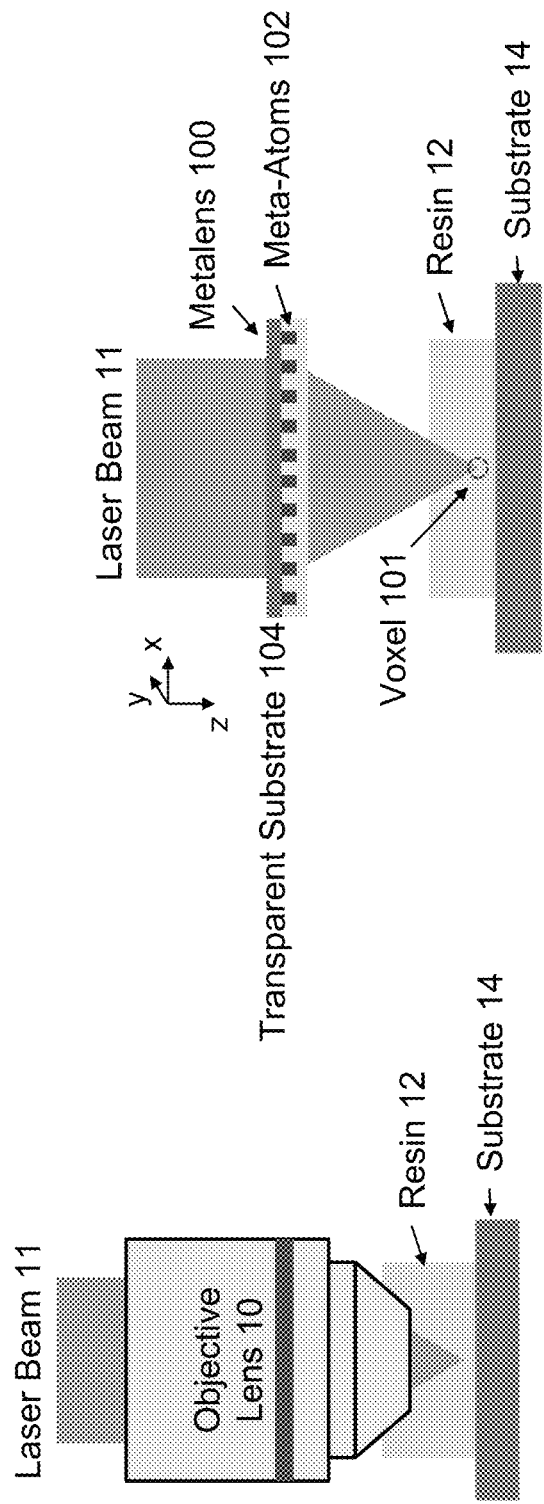

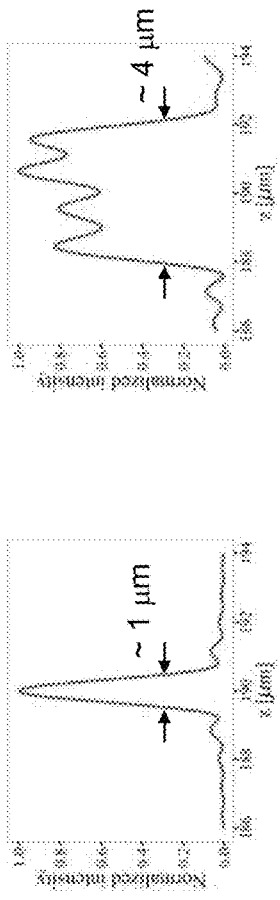
FIG. 2B
Conventional objective (diffraction limited)
~ 1 μm
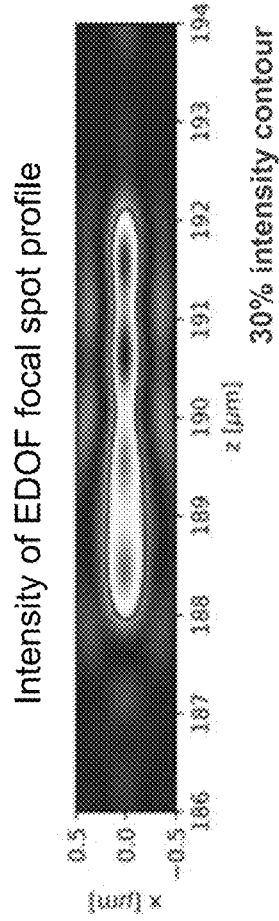
FIG. 2C
Metalens with extended depth-of-focus (EDOF)
~ 4 μm
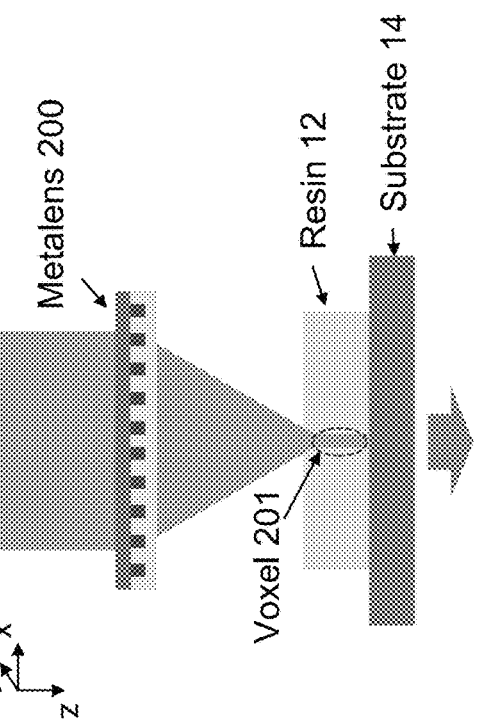
FIG. 2D
Intensity of EDOF focal spot profile
30% intensity contour
FIG. 2A

METHODS AND SYSTEMS FOR METASURFACE-BASED NANOFABRICATION

CROSS-REFERENCE TO RELATED APPLICATIONS

This application claims the priority benefit, under 35 U.S.C. 119(e), of U.S. Application No. 63/186,607, filed on May 10, 2021, the entire disclosure of which is incorporated herein by reference.

BACKGROUND

Direct laser writing (DLW) techniques exemplified by two-photon polymerization (TPP) offer versatile, mask-free fabrication alternatives to conventional photolithography for realizing micro-/nano-structures with fine feature dimensions. In comparison to other planar nanofabrication methods, DLW uniquely enables the fabrication of complex structures in three-dimensional (3-D) space and the potential capability to operate on non-planar surfaces. In a typical DLW process, a pulsed laser beam is tightly focused inside a photoresist film using an objective lens. By leveraging nonlinear processes (e.g., two-photon or multi-photon absorption, etc.) and intensity thresholds for polymerization, the effectively exposed region can be confined closely to the focal volume, where crosslinking of the prepolymer resist is initiated, forming a so-called "voxel" element with a feature size considerably smaller than the laser wavelength.

However, as a far-field lithography technique, key performance metrics (e.g., spatial resolution, depth of focus, working distance, etc.) of traditional DLW approaches are fundamentally limited by Abbé diffraction of conventional lithographic optical systems. Moreover, traditional focusing lenses typically lack the capability to tailor the generated 3-D point spread function (PSF) in either lateral or axial directions, resulting in limited degrees of freedom to control the voxel shape. In addition, the process of serially scanning the focused spot or pattern restricts the achievable throughput and poses scalability challenges for patterning on large-area or non-planar surfaces. Last but not least, traditional DLW process typically use complicated optical systems involving a train of bulky optical components.

SUMMARY

Methods, devices, and systems based on metasurface optics can enhance DLW performance and realize new functionalities. Metasurface optics used for DLW described herein can be applied similarly to microscopy systems to enhance imaging performance (e.g., resolution, depth of focus, working distance, PSF size/shape, multiplexed functions, etc.). Optical systems based on metasurfaces offer significant size, weight, performance, and cost (SWaP-C) advantages over traditional optical systems.

For instance, a metalens or other metasurface optic can be used to focus or shape a first beam to a first intensity pattern within a photoresist. This first intensity pattern polymerizes a first portion of the photoresist. The metalens can focus the first beam comprises over a depth of focus greater than or less than $\pm 2\lambda(f/D)^2$, where $\lambda$ is a wavelength of the first beam, f is a focal length of the metalens, and D is a diameter of the metalens. A non-planar (e.g., curved or stepped) surface may support the photoresist, in which case the first intensity pattern may include foci distributed with respect to (e.g., conformal with) the non-planar surface.

The first beam can have a first property (e.g., a first wavelength and/or polarization state), in which case the metalens can focus or shape a second beam having a second property different than the first property (e.g., a second wavelength and/or polarization state) to a second intensity pattern different than the first intensity pattern within the photoresist.

In some examples, the first intensity pattern initiates a polymerization reaction within a first portion of the photoresist and the second intensity pattern inhibits the polymerization reaction within a second portion of the photoresist overlapping with the first portion. This causes polymerization of a region of photoresist smaller than the first portion. The polymerized region of photoresist can have a lateral dimension smaller than a lateral dimension of the first intensity pattern and smaller than a diffraction-limited spot size of the metalens.

The first and second beams can be incident on the metalens at different angles, in which case the metalens can combine the first and second beams while focusing the first and second beams to the first and second intensity patterns, respectively.

A particular method of direct laser writing may include focusing, with a metalens, an initiating beam to a diffraction-limited spot within a photoresist and focusing or shaping, with the metalens, an inhibiting beam to an intensity pattern overlapping a first portion the diffraction-limited spot within the photoresist. The initiating beam polymerizes a second portion of the diffraction-limited spot excluding the first portion to produce a region of polymerized photoresist smaller than the diffraction-limited spot.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1A illustrates direct laser writing (DLW) using a conventional objective lens.

FIG. 1B illustrates DLW using a metalens.

FIG. 2A illustrates DLW using a metalens with an extended depth of focus.

FIG. 2B is a plot of the normalized intensity versus depth (axial coordinate) for a diffraction-limited conventional objective lens.

FIG. 2C is a plot of the normalized intensity versus depth (axial coordinate) for a metalens with an extended depth of focus.

FIG. 2D is a plot of the focal spot profile of a metalens with an extended depth of focus.

DETAILED DESCRIPTION

Figures 3A, 3B:
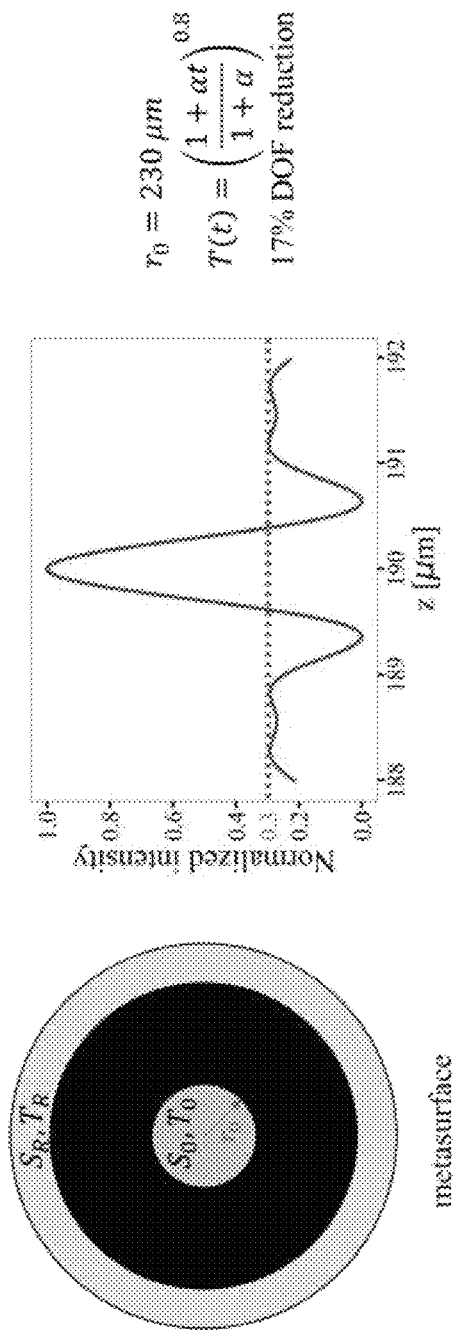
FIG. 3A illustrates a metalens design for realizing a compressed DOF.
FIG. 3B is a plot of the normalized intensity for versus depth (axial coordinate) for a metalens with a reduced or compressed depth of focus.

Our metasurface-based DLW offers several advantages over DLW with conventional optics. For example, a metalens or other metasurface can be used for on-demand configuration of light field and intensity distribution in 3-D space (such as inside photoresist), including, but not limited to, configuration of voxel dimensions, lateral resolution, axial resolution, depth of focus, working distance, voxel arrays, 2-D/3-D intensity pattern, multiplexed functions, etc. Even if the metalens is static or fixed, the light field and intensity distribution can be changed by changing the wavelength, polarization, incident angle, etc. of the beam(s) incident on the metalens.

The metalens can perform multiple functions, including beam combining and beam shaping, on different beams with different wavelengths, polarizations, or other characteristics. For instance, a single metalens can focus beams of different wavelengths or polarizations to individually tailored, overlapping patterns for super-resolution, photoinduction-inhibited nanofabrication. Metalens-based DLW systems can be simpler and more compact and have fewer elements than conventional DLW systems, which typically have bulky objective lens assemblies and complicated optical systems.

A metasurface optic includes optically thin, subwavelength-arrayed nano-antennae (also called meta-atoms) that can provide arbitrary control of the phase, amplitude, and/or polarization of an optical wavefront. These meta-atoms can be formed of transparent or opaque material deposited on a transparent or reflective substrate to form a fixed or static metasurface optic. The meta-atoms' sizes, shapes, and arrangements can be selected so that the metalens can provide polarization- or wavelength-selective control. Typically, meta-atoms have lateral dimensions and are arrayed at pitches on the order of nanometers or microns (e.g., less than one wavelength at the design wavelength). For polarization control, the meta-atoms may not have four-fold symmetry, for example, with a rectangular cross-section. For wavelength control, the heights of the meta-atoms are selected to give different phase delays at different wavelengths. Put differently, the meta-atoms should provide distinct phase delays for light with different properties. When combined together, the entire metasurface collectively provides completely different phase profiles at each wavelength (or polarization) state.

Meta-optics can also be constructed using active materials (e.g., based on phase change materials, or other mechanisms, such as electro-optic, thermo-optic, all-optical, magneto-optical, electrochemical, hydrogenation effects, etc.) or mechanical tuning, to realize reconfigurable meta-optics to achieve dynamically tunable functions.

Meta-optical systems can also be used for customizable light detection or illumination using photodetectors or light sources (emitters) with geometries and positions matching the focal spot patterns of the metalens. For an illumination system, light emitters (e.g., VCSELs or LEDs) positioned appropriately in the metalens's focal region act as an integrated optical illuminator. Such optical detection/illumination configurations can operate with multiple beams to/from the detectors/emitters (e.g., combining, splitting, modulating beams with different wavelengths, polarizations, etc.) and can be employed in optical systems for display, communication, sensing, imaging, computing, etc.

Meta-Optics for Engineered Light Intensity Patterns in Direct Laser Writing (DLW)

FIGS. 1A and 1B illustrate direct laser writing (DLW) with a conventional objective lens 10 and a metasurface flat optic (e.g., a metalens or meta-optic) 100, respectively. In FIG. 1A, the conventional objective lens 10 focuses an incident laser beam 11 to a spot in photosensitive resin 12, also called photoresist or simply resist, supported by a substrate 14. The photoresist 12 can be either liquid or solid and either monomer or polymer. The focused laser beam 11 polymerizes the resin at the focal spot, e.g., through two-photon polymerization or another nonlinear process. Moving the focal spot with respect to the resist 12 (e.g., by moving the lens 10 or the substrate 14 with a stage) traces out a pattern of polymerized resist.

In FIG. 1B, the metasurface flat optic (metalens) 100 focuses the incident laser beam 11 to a spot or pattern in the resin 12, which is again supported by the substrate 14. In other configurations, the metalens 100 can be on the opposite side of the (transparent) substrate 14 and can focus the laser light to the resist 12 through the substrate 14. Alternatively, instead of focusing light into a solid or semi-solid resist 12, the metalens 100 can be immersed in and focus light through/into a liquid monomer, portions of which polymerize during writing.

The metasurface flat optic 100 includes an array of meta-atoms 102 that are formed on a transparent substrate 104 and that modify the properties of an incoming wave fronts, such as amplitude, phase, and polarization. In FIG. 1B, the meta-atoms 102 are covered with an optional layer or coating of low-index material 106, e.g., a polymer or glass. The meta-atoms 102 can also be uncovered, in which case they can either be surrounded by air or immersed in the liquid resist 12 during writing.

The metasurface flat optic 100 can reshape or focus one or more laser beams into the thick-film photoresist 12. The meta-optic 100 transforms the incident light beams into certain optical intensity profiles in 3-D space to enhance the DLW process or introduce new functions. These functions may include multiplexed excitation or illumination and/or imaging functions on the same metasurface with separately engineered light beam intensity patterns by using different wavelengths or polarization states. Depending on the properties of the incident beam (e.g., wavelength, polarization, incident angle, etc.), the meta-atoms 102 can be designed to provide different optical responses (e.g., phase, amplitude, polarization conversion, etc.), accordingly.

If desired, the meta-optic 100 can be moved with respect to the resist 12 in order to trace a pattern of polymerized photoresist, just like the conventional objective lens 10. In addition, the meta-optic 100 can be configured to form different patterns or to focus light at different spots in the photoresist 12 as a function of the properties of the incident beam(s) 11. For instance, the meta-optic 100 may be configured to focus light of different wavelengths to different depths or to focus light of different polarizations to different patterns. Thus, the meta-optic 100 can polymerize a potentially very sophisticated pattern in the resist 12 with an incident beam whose properties are varied instead of moving with respect to the resist 12. This potentially eliminates the moving parts (e.g., stages) from the DLW system, increases DLW speed (no waiting for moving stages), and reduces unwanted fabrication imperfections or variations due to vibrations, etc., caused by moving the lens with respect to the resist.

For TPP or other types of laser writing based on nonlinear absorption, e.g., most femtosecond laser writing, micromachining, and laser ablation, the metalens specifications can be less stringent/more relaxed. In particular, for regular lithography, stray light is a major concern since it exposes the photoresist. For TPP, on the other hand, stray light is less of a concern given the polymerization reaction's quadratic dependence of absorption on intensity. TPP and other nonlinear absorption are particularly well suited to writing or making 3-D structures in photoresist.

Metalens with Extended or Compressed Depth-Of-Focus for DLW

The axial resolution of a conventional objective lens depends on its depth of focus (DOF), which is determined by its numerical aperture (NA)—a larger NA usually results in a smaller DOF and vice versa. For a conventional objective lens, the DOF can be defined as $\pm 2\lambda(f/D)^2$, where $\lambda$ is the wavelength of the incident beam, f is the lens focal length, and D is the lens diameter. In other words, for a conventional lens, there is a trade-off between NA and DOF. For the same NA as a conventional lens, a metalens can have a larger DOF; likewise, for the same DOF as a conventional lens, a metalens can have a larger NA (and hence a smaller resolvable spot size).

Similar to lateral resolution, the capability of conventional lenses to tailor the DOF or axial resolution (either decreasing or increasing) is constrained by the diffraction of light. For a given wavelength, focal length, and lens diameter, the DOF of a metalens can be smaller or larger than the DOF given by $\pm 2\lambda(f/D)^2$. An extended DOF for a metalens can be obtained using metalens design processes like those disclosed in F. Yang, S. An, M. Shalaginov, H. Zhang, C. Rivero-Baleine, J. Hu, and T. Gu, "Design of broadband and wide-field-of-view metalenses," Opt. Lett. 46, 5735-5738 (2021), which is incorporated herein by reference for all purposes. For example, an extended DOF can be achieved by designing the metalens to generate a continuous train of engineered focal spots along its optical axis.

FIGS. 2A-2D illustrate a metalens 200 designed to form a focal spot profile with an extended depth-of-focus (EDOF). FIG. 2A shows the metalens 200 being used in a DLW system to illuminate (and polymerize) a long, skinny voxel 201 in photoresist 12. Removing the uncured (unpolymerized) resist 12 leaves a nanopillar 202 of cured (polymerized) resist 12 extending from the substrate 14. Using the metalens 200 to illuminate several voxels 201 leaves an array of nanopillars 202 arranged in a pattern based on the patent or sequence of the illumination.

FIGS. 2B and 2C are plots of the axial resolutions of a diffraction-limited conventional objective lens and the metalens 200, respectively. In other words, FIGS. 2B and 2C show sections of the PSFs for the conventional objective lens and the metalens 200, respectively. The arrows in the plots indicate the 30% peak intensity levels. The peaks in each plot indicate that the beam is at a focus (its intensity may be high enough to polymerize the resin). In FIG. 2B, the peak width is only about 1 µm, corresponding to a depth of field of about 1 µm for the conventional objective lens. In FIG. 2C, however, the intensity has a broader, rippled profile that is about 4 µm wide, corresponding to a depth of focus of about 4 µm for the metalens. In other words, the metalens has a focal spot profile with an elongated optical intensity distribution along the axial direction (z direction).

FIG. 2D shows a map of the intensity of the metalens's focal spot profile as a function of transverse and axial dimensions (vertical and horizontal axes, respectively). The edge of the lighter region is the 30% intensity contour. The transverse or lateral spot width is less than 1 µm. This is roughly the same as the lateral resolution (diffraction-limited spot size) of the conventional lens modeled in FIG. 2B. As compared to the diffraction-limited conventional lens, the metalens has the same NA and spot size with a depth of focus that is about four time larger.

Using a metalens with an extended DOF allows the generation of long voxels with high lateral resolutions using a single-shot exposure, thereby facilitating the formation of high-aspect-ratio optical structures, such as nano-pillars, nano-fins, etc. In comparison, realize similar structures with DLW using a traditional objective lens typically involves scanning the focused spot in the axial direction. In addition to having a different (e.g., longer) DOF, the metalens can also be designed to adjust the working distance of the DLW system. For example, the metalens could be a multiplexed multi-focal metalens that provides different working distances at different wavelength/polarization states. By switching the light properties between wavelengths or polarization states, it is possible to change the working distance almost arbitrarily over a large range, depending on the application, without moving the metalens.

FIGS. 3A and 3B illustrate a metalens with a DOF that is reduced or compressed compared to that of a standard lens to enhance the axial resolution. FIG. 3A is a view of the metalens along the optical axis. The metalens has a metasurface that features spatially modulated transmission to reduce the DOF. FIG. 3B shows the normalized intensity versus depth or axial coordinate, indicating about 17% reduction of the DOF compared to a perfect conventional lens with the same NA. The dashed line in FIG. 3B represents an exemplary threshold intensity for two-photon polymerization (TPP) in the resist. The reduction of DOF in this design may come at the expense of increasing axial side lobe intensity as seen in FIG. 3B. This is in general not a major concern for nonlinear DLW since the sidelobes are usually too weak to induce photochemical polymerization reactions, which generally occur only at or near the highest point of the high-intensity focal spot. Put differently, increasing axial sidelobe intensity can be reduced or suppressed by reducing this intensity value below the threshold intensity.

Metalens for Voxel Array or Pattern Generation/Projection

Figure 4B:
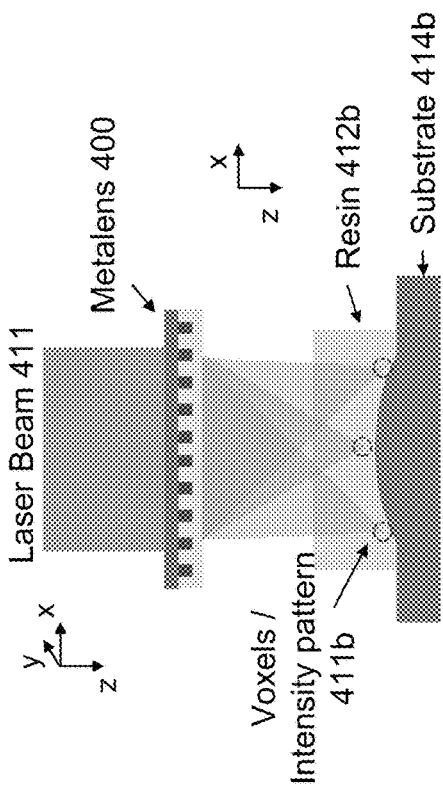
FIG. 4B illustrates DLW using a metalens for voxel arrays or intensity pattern generation on a non-planar (curved) surface.
Figure 4A:
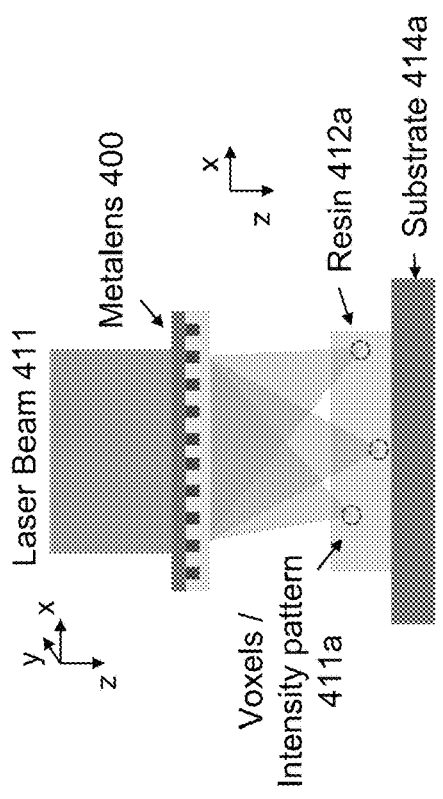
FIG. 4A illustrates DLW using a metalens for voxel arrays or intensity pattern generation on a planar (flat) surface.

FIG. 4A depicts a metalens 400a designed to form multiple focal spots in 3-D space from a single laser beam 411. In this case, the metalens 411 forms an intensity pattern 411a with different focal spots, at different axial and lateral locations, in photoresist or resin 412a on a planar or flat substrate 414a. The focal spots can be spaced apart laterally by more than the metalens's diffraction-limited spot size and axially by more than the DOF to prevent overlapping. In addition to being in different locations, the focal spots can have different shapes. The focal spots may be intense enough to polymerize the photoresist 412a, while the rest of the intensity pattern 411a may be too weak to induce polymerization. This metalens 400 and the intensity pattern 411a can be used to generate voxel arrays of cured or polymerized photoresist.

The intensity pattern 411a can be a 2-D or 3-D intensity pattern; 2-D intensity patterns can be used to make 2-D or 3-D voxel arrays, and 3-D intensity patterns can be used to make 3-D voxel arrays. The intensity pattern 411a may vary depending on the incident wavefront; for instance, illuminating the metalens 400a with a planar wavefront may produce a 2-D intensity pattern, whereas illuminated the metalens 400a with a non-planar wavefront or simultaneously with several planar wavefronts at different angles may produce a 3-D intensity pattern. In addition, the same metalens 400a can be configured to produce different patterns based on different incident illumination patterns, wavefronts, wavelengths, or polarizations. Such functions can be multiplexed during the design and operation. This approach allows the optical projection and formation of an areal or volume structure via a single-shot exposure of the photoresist 412a. These metalens-enabled methods can improve the writing throughput of the DLW process compared to the traditional serial writing process used with a conventional lens.

Voxel Array or Intensity Pattern Generation/Projection on Non-Planar Surfaces

FIG. 4B depicts a metalens 400b designed to form multiple focal spots in 3-D space or project 2-D/3-D intensity patterns on non-planar surfaces (e.g., a lens surface). In FIG. 4B, the metalens 400b forms a 3-D intensity pattern 411b in resin 412b on a curved (non-planar) substrate 414b. The intensity pattern 411b includes focal spots (circled) that are on or near (e.g., with nanometers or microns) the curved/non-planar portion of the boundary between the resin 412b and the curved (non-planar) substrate 414b. These focal spots are at different depths within the resin 412b/different focal planes of the metalens 400b. For instance, the focal spots can conform to the boundary between the resin 412b and the substrate 414b or be within the volume of the resin 412b.

Again, the focal spots are intense enough to polymerize the resin 412b, whereas other portions of the intensity pattern 411b may be too weak to induce polymerization. The polymerized portions of resin form voxel arrays whose positions and shapes can be designed according to the geometric shape of the non-planar surface. This makes it possible to conformally fabricate an array of structures on the non-planar surface 412b using DLW, potentially in a single shot. This pre-defined, single-shot method can effectively eliminate alignment challenges associated with serial DLW on a curved, stepped, or warped surface using a scanned or scanning conventional objective lens, reduce the total DLW time, and increase the overall writing throughput.

Multifunctional Meta-Optics for Multi-Beam DLW

Meta-optics can also be configured to operate with multiple beams and realize multiple functions, thereby enhancing DLW by leveraging processes such as super-resolution photoinduction-inhibited nanofabrication. In addition to the super-resolution photoinduction-inhibited process, other functions enabled by meta-optics include multiplexed functions/channels for writing, illumination, and/or imaging (e.g., finding the writing interface or imaging the formed structure or entire region). A metasurface can be designed to generate channels with different optical intensity patterns/path at different wavelengths/polarization states. One illumination/imaging channel may generate a structured light or flood illumination pattern to find a planar or non-planar writing interface or to image the entire region. Another illumination/imaging channel may focus more closely on the region near the writing beam to examine the formed structure.

Optical diffraction limits the smallest or finest possible spatial resolution of DLW using conventional optical systems for far-field lithography. The spatial resolution can be enhanced beyond the diffraction limit by combining single-/multi-photon polymerization and stimulated emission depletion (STED), which is a photo-induced deactivation process. In such an approach, one laser beam (an initiating beam) is used to initiate optical reactions (e.g., polymerization in a photoresist) and a second laser beam (an inhibiting beam) is used to deactivate the optical reaction (e.g., suppressing the photopolymerization process). The initiating beam induces polymerization or photochemical reaction(s) only in regions where the inhibiting beam is at an intensity too low to be effective.

In principle, the initiating and inhibiting beams can be spatially shaped with different point spread functions (PSFs) in 3-D space to obtain feature sizes much smaller than the excitation wavelength (and hence smaller than the diffraction-limited spot size) of the initiating beam. However, overlapping PSFs for beams at different wavelengths usually involves a train of bulky optical components configured for beam shaping and combining. Such optical system complexity further limits the achievable performance and functionalities.

Figure 5A:
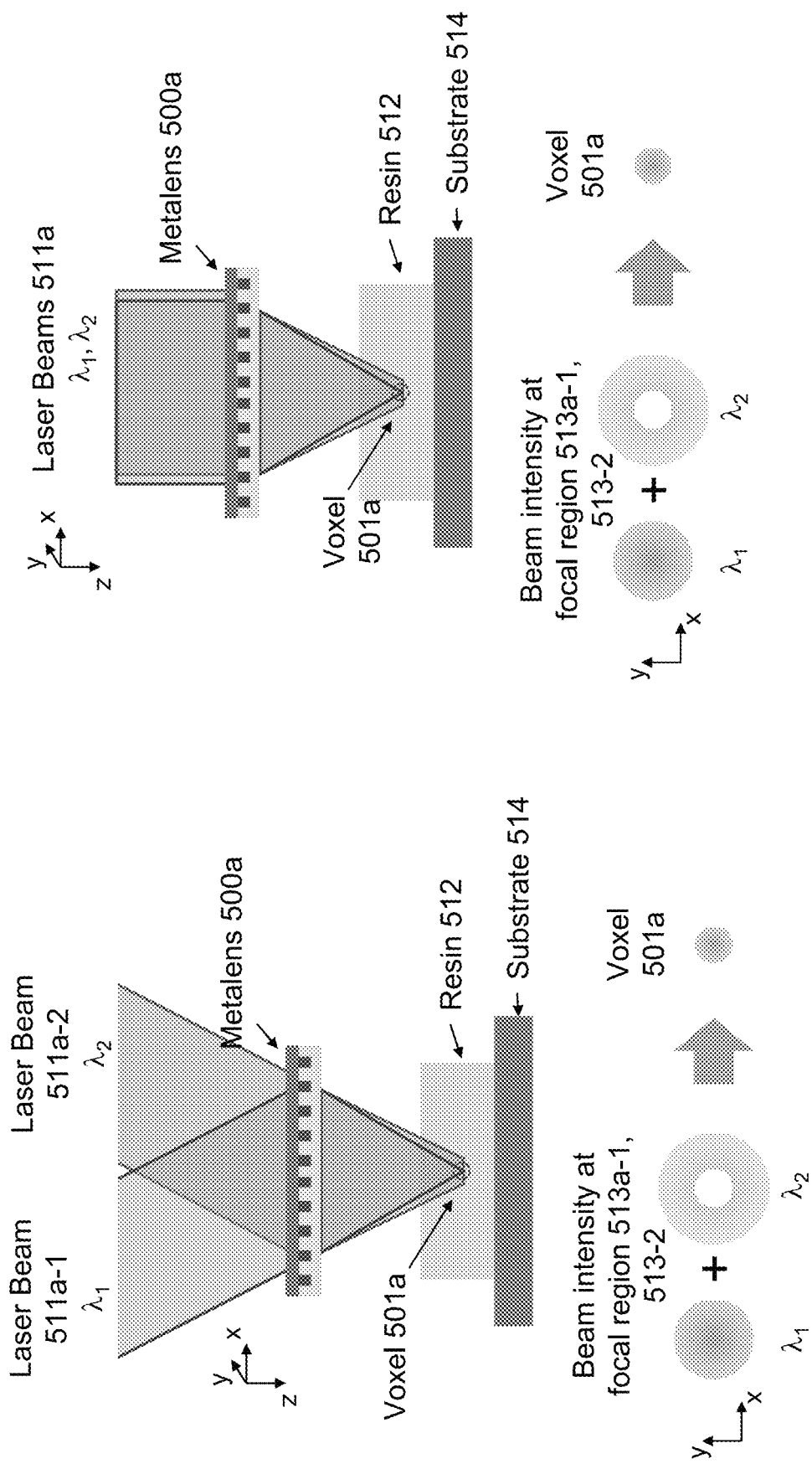
FIG. 5A illustrates DLW using a multifunctional metalens that performs different beam shaping functions on light beams with different wavelengths.
Figure 5B:
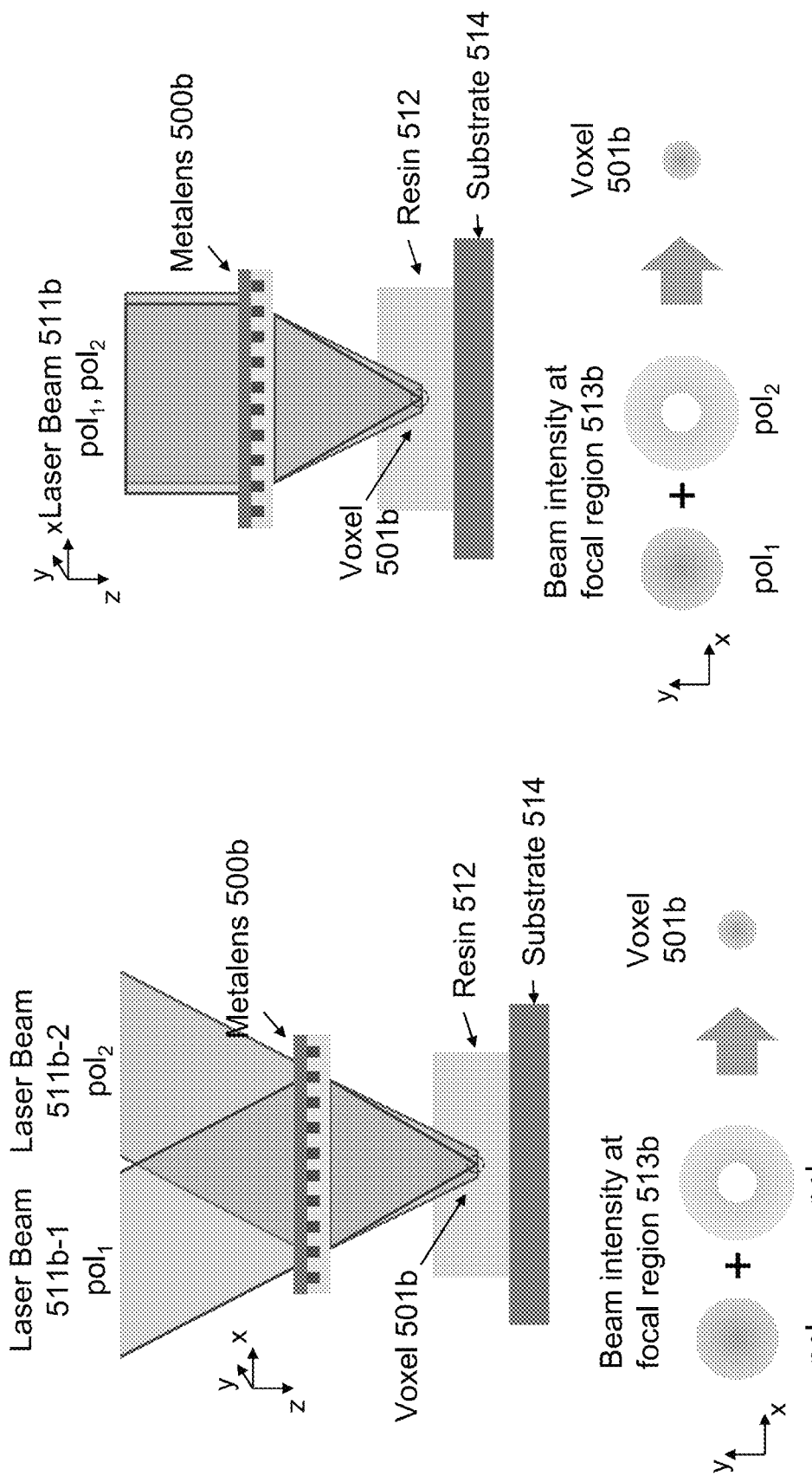
FIG. 5B illustrates DLW using a multifunctional metalens that performs different beam shaping functions on light beams with different polarization states.

FIGS. 5A and 5B illustrate super-resolution DLW with multifunctional, multi-beam meta-optics instead of bulky optical systems. FIGS. 5A and 5B each show a single metalens 500a/500b that performs different beam shaping or modulation functions for different incident light beams. Depending on the incident beam properties (e.g., wavelength, polarization, incident angle, etc.), the meta-atoms can be designed to provide different optical responses (e.g., phase, amplitude, polarization conversion, etc.), thereby varying the overall function of the metalens 500a/500b. If desired, a single metalens can focus two or more laser beams to different beam shapes or patterns simultaneously (or sequentially) for writing or creating features that are smaller than the diffraction limit.

In FIG. 5A, the metalens 500a focuses different laser beams 511a at different wavelengths to different patterns in resin 512 supported by an almost arbitrarily shaped substrate 514 (e.g., flat, curved, rippled, stepped, etc.). A first laser beam 511a-1 is at wavelength of $\lambda_1$ and acts as the initiating beam; a second laser beam 511a-2 is at a wavelength of $\lambda_2$ and acts as the inhibiting beam. The laser beams 511a can be incident on the metalens 500a at different angles (left) or can be coincident (right).

In either case, the metalens 500a focuses the initiating beam 511a-1 (e.g., designed to possess a hyperbolic phase profile for $\lambda_1$) so that the initiating beam intensity is transformed to a Gaussian shape 513a-1 at a focal region in the resin 512. At $\lambda_2$, the metalens 500a decreases the central optical intensity but increases the edge intensity of the inhibiting beam 511a-2 (e.g., designed to possess a helical phase for $\lambda_2$) so that the inhibiting beam intensity is transformed to a ring-shaped or toroidal intensity distribution 513a-2 at the focal region. The radius of the hole at the center of the torus 513a-2 is smaller than the outer radius of the spot 513a-1. Consequently, the overlapping of the two beams 511a shaped by the same multifunctional metalens 500a results in a super-resolved voxel 501a formed in the resin 512 at the center of the focal region.

In FIG. 5B, the initiating beam 511b-1 and the inhibiting beam 511b-2 have polarizations of pol1 and pol1, respectively, and the metalens 500b performs different beam shaping functions according to the polarization state. The beams can be coincident (right) or incident at different angles (left). In either case, the metalens 500b can focus the initiating beam 511b-1 to a diffraction-limited, Gaussian spot 513b-1 and can focus the inhibiting beam 511b-2 to a ring-shaped or toroidal intensity distribution 513b-2 at the focal region. Again, the radius of the hole at the center of the torus 513b -2 is smaller than the outer radius of the spot 513b-1, so the overlapping beams 513b leave a voxel 501b whose outer radius is smaller than the radius of the diffraction-limited, Gaussian spot 513b-1.

The initiating and inhibiting functions of the beams can be activated by controlling the pulsing conditions of the beams. For example, femtosecond-pulsed and continuous-wave (CW) lasers at the same wavelength can be used as the initiating and inhibiting beams, respectively, using nonlinear interactions between the material of the meta-lens (e.g., of the meta-atoms) and either or both of the pulsed and CW beams.

A metalens may also be utilized to realize a variety of voxel shapes. For example, if an annular phase profile (which introduces a cylindrical π phase shift in the center of the beam) is applied to the inhibiting beam 511a/b-2 in FIGS. 5A and 5B, the optical intensity at center of the focal region can be in principle reduced to zero in both the axial and transverse directions, effectively suppressing the voxel dimension and resolution in 3-D when combined with a focusing initiating beam 511a/b-1.

Beam-Combining, DLW Meta-Optics

The left sides of FIGS. 5A and 5B show how a single meta-optic (metalenses 500a and 500b) can deflect different beams differently (e.g., to re-direct them towards the same focal region) in addition to (or instead of) shaping them differently. In addition to a common focusing phase profile, the deflecting phase profiles vary according to the beam incident angles so that we can re-direct beams from different directions to e.g., normal incidence and combine and focus them towards the focal plane. In other words, a single metalens 500a/b can integrate multi-beam DLW and beam combining. This is considerably simpler than in a conventional optical system, which usually have multiple beam splitting and combining elements for operating with multiple beams.

Example phase profiles of the multifunction meta-optic under light with different properties including, as shown in FIGS. 5A and 5B:

1. Initiating beam at $\lambda_1$ (or polarization 1): focusing phase (e.g., a hyperbolic phase profile)+deflecting phase (e.g., a linear phase profile that brings the obliquely incident beam to normal incidence)
2. Inhibiting beam at $\lambda_2$ (or polarization 2): ring-shaping phase (e.g., a helical phase profile)+deflecting phase (e.g., a linear phase profile that brings the obliquely incident beam to normal incidence)

In addition to beam shaping phase profiles based on analytical solutions, the multifunctional meta-optics can also be designed inversely based on desired focal region intensity distribution. This may include machine-learning-based design of metasurfaces coupled with direct search optimization.

Multifunctional Meta-Optics for Light Emission and Detection

In addition to DLW processes, the meta-optical system described above can also be integrated with photodetectors and light emitters for optical detection and/or illumination. When photodetectors with geometries and positions matching the focal spot patterns are positioned at the focal region, the metalens can focus light with different properties (e.g., wavelength, polarization, incident angle, etc.) to different photodetectors with corresponding beam dimension, shape, intensity, position, pattern, or other optical properties. When the meta-optical system is used for illumination, light emitters (e.g., VCSELs, LEDs) with geometries and positions matching the light intensity patterns corresponding to different wavelengths or polarization states can be positioned at the focal region. The metalens combines the light from the different emitters to produce one or more beams, causing the emitter to act together as an integrated optical illuminator. Such optical detection/illumination configurations are versatile tools to operate with multiple beams to/from the detectors/emitters (e.g., combining, splitting, modulating beams with different wavelengths, polarizations, etc.) and can be employed in optical systems for display, communication, sensing, imaging, computing, etc.

The metalens's intensity pattern may be selected based on the application. For example, it may be a 2-D spot array for a metalens optically coupled to a 2-D light emitter or detector array. The metalens could also project laterally displaced, wavelength-dependent focal spots with shapes, dimensions, and positions matching a multi-wavelength light emitter array (e.g., red-green-blue (RGB) pixels in a display).

Applications that benefit from multiplexing (or demultiplexing) multiple optical signals/beams into (or from) one spatial channel include display systems, optical communications systems, and active sensing systems. For example, in display systems, a meta-optic can combine, split, and/or modulate beams from multiple laterally or concentrically displaced (or other array configurations) light emitters (e.g., RGB pixels). In free-space optical communication systems, a meta-optic can integrate and couple light from multiple transceiver arrays into one beam. And in active imaging/sensing systems, beams from multiple illumination light emitters can be combined, split, and/or modulated using a single metalens.

Meta-optics can be extended to other light-matter interaction applications using the concepts described above, including 2D/3D PSF engineering, multiplexed functions, and combinations thereof. For example, a multifunctional metalens objective can be used in microscopy systems that benefit from specially designed PSFs and/or different light properties (e.g., wavelengths) for different tasks, such as illumination/excitation/stimulation and imaging/collection/probing light. It comprises at least a substrate with a multifunctional metasurface on one surface. The metalens combines multiplexed illumination/excitation and imaging capabilities. The metasurface is configured in a first state to generate a first light intensity/field distribution or imaging configuration and in a second state, to generate a second light intensity/field distribution or imaging configuration.

In one embodiment, the multifunctional metalens is configured in a first state illuminates a region or object and in a second state images (or collect light from) a region or object. A third (or more) state can be further included, in which the metalens illuminates the region/object with a different light intensity/field distribution pattern, or images (or collect light from) a region/object with a different configuration. The different states are different light wavelength, polarization, or their different combinations. The illumination beam (s) can be used to activate and structure the pattern of light-matter interaction processes, such as polymerization, fluorescence, Raman scattering, optical trapping, optogenetics and general imaging processes. Some applications include fluorescence microscopy, Raman spectroscopy, optogenetics, optical tweezing, etc.

For instance, consider a metalens that produces different light intensity/field distribution for light with different properties or states (e.g., different combinations of wavelength and/or polarization). This metalens can be used to illuminate an object with light at a first wavelength, which causes the object to fluoresce at a second wavelength, and collect the fluorescent light and direct it away from the source of the light at the first wavelength. Similarly, the metalens can illuminate an object with light in a first state, causing Raman scattering of light in a second state from the object, and collect and image the Raman-scattered light. The metalens can also simultaneously trap an object with light at a first wavelength and/or polarization and image the object with light at a second wavelength and/or polarization.

Figure 6:
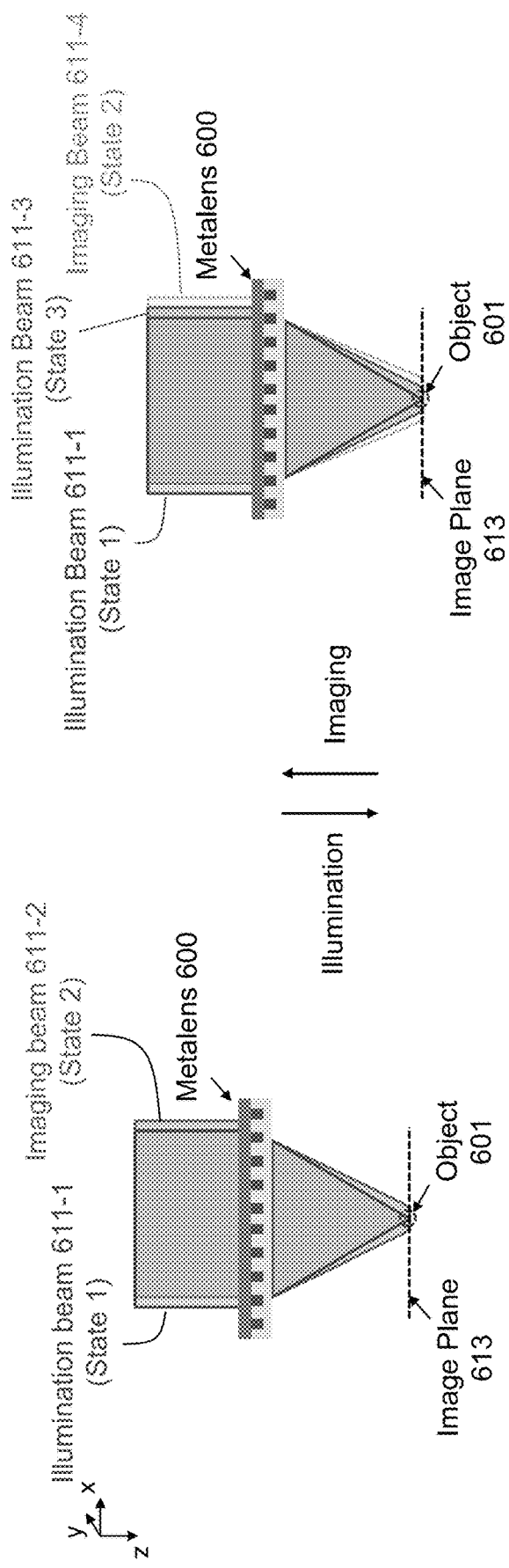
FIG. 6 illustrates a multifunctional metalens simultaneously imaging and illuminating an object in an image plane.

FIG. 6 illustrates a multifunctional metalens 600 combining multiplexed illumination/excitation and imaging capabilities. At left, the metalens 600 simultaneously illuminates and images an object 601 in an image plane 613 with an illumination beam 611-1 in a first state (e.g., a first wavelength and/or first polarization) and an imaging beam 611-2 in a second state (e.g., a second wavelength and/or second polarization) different than the first state. At right, the metalens 600 illuminates the object 601 with the illumination beam 611-1 and another illumination beam 611-3 in a third state while imaging the object 603 with an imaging beam 611-4 in the second state. That is, at left, the multifunctional objective metalens 600 illuminates a region/object with light in a first state while collecting light in the second state from the same region/object. At right, with the third state light, the metalens 600 illuminates the region/object with a different light intensity/field distribution pattern and/or images (or collects light from) the region/object with a different configuration. The different states are different light wavelengths, polarizations, or different combinations of wavelength and polarization. The illumination beam(s) can be used to activate and structure the pattern of light-matter interaction processes, such as polymerization, fluorescence, Raman scattering, optical trapping, optogenetics and general imaging processes. And the imaging beams can include fluorescent light and/or Raman-scattered light.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of direct laser writing, the method comprising:
   focusing or shaping, with a metalens, a first beam to a first intensity pattern within a photoresist, the first intensity pattern polymerizing a first portion of the photoresist; and
   supporting the photoresist with a non-planar surface,
   wherein focusing the first beam to the first intensity pattern comprises focusing different portions of the first beam to foci distributed with respect to the non-planar surface.

2. The method of claim 1, wherein focusing the first beam comprises focusing the first beam over a depth of focus greater than $2\lambda(f/D)^2$, where $\lambda$ is a wavelength of the first beam, f is a focal length of the metalens, and D is a diameter of the metalens.

3. The method of claim 1, wherein focusing the first beam comprises focusing the first beam over a depth of focus less than $2\lambda(f/D)^2$, where $\lambda$ is a wavelength of the first beam, f is a focal length of the metalens, and D is a diameter of the metalens.

4. The method of claim 1, wherein the first beam has a first property, further comprising:
   focusing or shaping, with the metalens, a second beam having a second property different than the first property to a second intensity pattern different than the first intensity pattern within the photoresist.

5. The method of claim 4, wherein the first property is a first wavelength and the second property is a second wavelength.

6. The method of claim 4, wherein the first property is a first polarization state and the second property is a second polarization state.

7. The method of claim 4, further comprising:
   initiating, by the first intensity pattern, a polymerization reaction within a first portion of the photoresist; and
   inhibiting, by the second intensity pattern, the polymerization reaction within a second portion of the photoresist overlapping with the first portion to polymerize a region of photoresist smaller than the first portion.

8. The method of claim 7, wherein the region of photoresist has a lateral dimension smaller than a lateral dimension of the first intensity pattern and smaller than a diffraction-limited spot size of the metalens.

9. The method of claim 4, wherein the first beam is incident on the metalens at a first angle and the second beam is incident on the metalens at a second angle different than the first angle, and further comprising:
   combining, by the metalens, the first beam and the second beam while focusing the first beam to the first intensity pattern and focusing the second beam to the second intensity pattern.

10. A system comprising,
    a photoresist; and
    a metalens comprising:
        a transparent substrate; and
        a metasurface disposed on a surface of the transparent substrate and configured to generate a first light intensity/field distribution in the photoresist from incident light in a first state and to generate a second light intensity/field distribution in the photoresist from incident light in a second state,
    wherein the first state is at least one of a first polarization state or a first wavelength state and the second state is at least one of a second polarization state or a second wavelength state.

11. The system of claim 10, wherein the first light intensity/field distribution is different than the second light intensity/field distribution.

12. The system of claim 10, wherein the metalens has a focal length f, a diameter of D, and a depth of focus greater than $2\lambda(f/D)^2$, where $\lambda$ is a wavelength of the incident light.

13. The system of claim 10, wherein the metalens has a focal length f, a diameter of D, and a depth of focus less than $2\lambda(f/D)^2$, where $\lambda$ is a wavelength of the incident light.

14. The system of claim 10, further comprising:
    a non-planar surface supporting the photoresist, and
    wherein the first light intensity/field distribution comprises foci distributed with respect to the non-planar surface.

15. The system of claim 10, wherein the first light intensity/field distribution causes a polymerization reaction within a first portion of the photoresist and the second light intensity/field distribution inhibits the polymerization reaction within a second portion of the photoresist overlapping with the first portion to produce a polymerized region of photoresist smaller than the first portion.

16. The system of claim 15, wherein the polymerized region of photoresist has a lateral dimension smaller than a lateral dimension of the first light intensity/field distribution and smaller than a diffraction-limited spot size of the metasurface.

17. A method of direct laser writing, the method comprising:

focusing or shaping, with a metalens, a first beam having a first property to a first intensity pattern within a photoresist, the first intensity pattern polymerizing a first portion of the photoresist, wherein the first beam is incident on the metalens at a first angle;

focusing or shaping, with the metalens, a second beam having a second property different than the first property to a second intensity pattern different than the first intensity pattern within the photoresist, wherein the second beam is incident on the metalens at a second angle different than the first angle; and combining, by the metalens, the first beam and the second beam while focusing or shaping the first beam to the first intensity pattern and focusing or shaping the second beam to the second intensity pattern.

* * * * *